US007773584B2

(12) United States Patent
Gorti et al.

(10) Patent No.: US 7,773,584 B2
(45) Date of Patent: Aug. 10, 2010

(54) METHOD AND APPARATUS FOR PROCESSING SESSION INITIATION PROTOCOL MESSAGES ASSOCIATED WITH A VOICE OVER IP TERMINAL

(75) Inventors: Sreenivasa Gorti, Austin, TX (US); Anil K. Doradla, Austin, TX (US); David Wolter, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 577 days.

(21) Appl. No.: 11/423,886

(22) Filed: Jun. 13, 2006

(65) Prior Publication Data

US 2007/0286160 A1 Dec. 13, 2007

(51) Int. Cl.
*H04L 11/66* (2006.01)
(52) U.S. Cl. ............... 370/352; 370/395.52; 370/420
(58) Field of Classification Search ................ 370/328, 370/329, 352, 356, 395.52, 230, 420; 455/404.1–2, 455/442, 432.1, 448, 456.5
See application file for complete search history.

(56) References Cited

U.S. PATENT DOCUMENTS

| 7,181,537 | B2* | 2/2007 | Costa-Requena et al. ... 709/246 |
| 7,315,742 | B2* | 1/2008 | Creamer et al. ............. 455/442 |
| 2004/0057425 | A1 | 3/2004 | Brouwer et al. |
| 2005/0063519 | A1 | 3/2005 | James |
| 2005/0090225 | A1 | 4/2005 | Muehleisen et al. |
| 2005/0135569 | A1 | 6/2005 | Dickinson et al. |
| 2005/0169248 | A1 | 8/2005 | Truesdale et al. |
| 2005/0213716 | A1 | 9/2005 | Zhu et al. |
| 2006/0079280 | A1 | 4/2006 | LaPerch |
| 2006/0114885 | A1* | 6/2006 | Baek et al. ................... 370/352 |
| 2006/0121916 | A1* | 6/2006 | Aborn et al. ............. 455/456.5 |
| 2006/0233158 | A1* | 10/2006 | Croak et al. ................ 370/352 |
| 2006/0293024 | A1* | 12/2006 | Benco et al. ............. 455/404.2 |
| 2007/0091798 | A1* | 4/2007 | Gobara et al. ............... 370/230 |
| 2007/0280213 | A1* | 12/2007 | Sindhwani et al. .......... 370/356 |
| 2007/0286170 | A1* | 12/2007 | Khan et al. ................ 370/356 |

OTHER PUBLICATIONS

Schulzrinne et al., "Providing Emergency Services in Internet Telephony", IEEE Internet Computing, IEEE Service Center, New York, NY, US, Jun. 2002, pp. 39-47.
Schulzrinne et al., "Emergency Services for Internet Telephony Systems", IETF Standard-Working Draft, Internet Engineering Task Force, IETF, CH, No. 2, Oct. 18, 2004, pp. 1-26.
Mintz-Habib et al., "A VoIP Emergency Services Architecture and Prototype", Computer Communications and Networks, 2005. ICCCN 2005. Proceedings. 14th International Conference on San Diego, CA, USA Oct. 17-19, 2005, Piscataway, NJ, USA, IEEE, Oct. 17, 2005, pp. 523-528.

* cited by examiner

*Primary Examiner*—CongVan Tran

(57) ABSTRACT

An apparatus and method are disclosed for processing session initiation protocol (SIP) messages associated with a Voice over IP (VoIP) terminal. An apparatus that incorporates teachings of the present disclosure may include, for example, a network proxy having a controller that manages a communications interface in a communication system. The controller can be programmed to receive from a VoIP terminal a SIP message comprising a request to communicate with a destination point, detect from the SIP message a lack of location information associated with the VoIP terminal, and transmit a location query to one among the VoIP terminal, and a gateway connecting the VoIP terminal to the network proxy. Additional embodiments are disclosed.

21 Claims, 3 Drawing Sheets

METHOD AND APPARATUS FOR PROCESSING SESSION INITIATION PROTOCOL MESSAGES ASSOCIATED WITH A VOICE OVER IP TERMINAL

RELATED APPLICATION

U.S. Patent Application, filed Jun. 13, 2006, by Khan et al., entitled "Method and Apparatus for Processing a Communication Request from a Roaming Voice Over IP Terminal," incorporated herein by reference in its entirety.

FIELD OF THE DISCLOSURE

The present disclosure relates generally to Voice over IP (VoIP) communications, and more specifically to a method and apparatus for processing session initiation protocol (SIP) messages associated with a VoIP terminal.

BACKGROUND

Multimode VoIP terminals can roam on a number of wired or wireless access technologies by way of a common gateway such as a residential gateway. Because of the nomadic nature of multimode VoIP terminals, it can be difficult to know when said terminals are roaming outside of a home network (e.g., a residence or commercial enterprise) since what is generally known about the terminal is its IP address which is not fixed to a single location. It is similarly a challenge to locate the VoIP terminal once it has roamed outside of its home network.

These complications can make call processing problematic for service providers especially in situations where the caller is attempting to communicate with an emergency response center such as a public service access point (PSAP) for 911 services which requires knowledge of the terminal's location to comply with Federal Communications Commission (FCC) regulations.

A need therefore arises for a method and apparatus for processing SIP messages associated with a VoIP terminal.

DETAILED DESCRIPTION OF THE DRAWINGS

Embodiments in accordance with the present disclosure provide a method and apparatus for processing SIP messages associated with a VoIP terminal.

In a first embodiment of the present disclosure, a computer-readable storage medium in a wireless access point (WAP) can have computer instructions for detecting a session initiation protocol (SIP) message initiated by a VoIP terminal requesting communication with a public service access point (PSAP), inserting location information associated with the WAP into the SIP message, and transmitting the SIP message to a network proxy.

In a second embodiment of the present disclosure, a network proxy can have a controller that manages a communications interface in a communication system. The controller can be programmed to receive from a Voice over IP (VoIP) terminal a session initiation protocol (SIP) message comprising a request to communicate with a destination point, detect from the SIP message a lack of location information associated with the VoIP terminal, and transmit a location query to one among the VoIP terminal, and a gateway connecting the VoIP terminal to the network proxy.

In a third embodiment of the present disclosure, a gateway can have a controller programmed to detect a signaling message initiated by a VoIP terminal directed to a network proxy, insert location information associated with the gateway into the signaling message, and transmit the signaling message to the network proxy In a fourth embodiment of the present disclosure, a computer-readable storage medium in a voice over IP (VoIP) terminal can have computer instructions for receiving location information from one among a location determination device of the VoIP terminal and a radio frequency identification (RFID) device of a gateway, transmitting to a network proxy a session initiation protocol (SIP) message comprising the location information and a request to communicate with an emergency response center.

Figure 1:
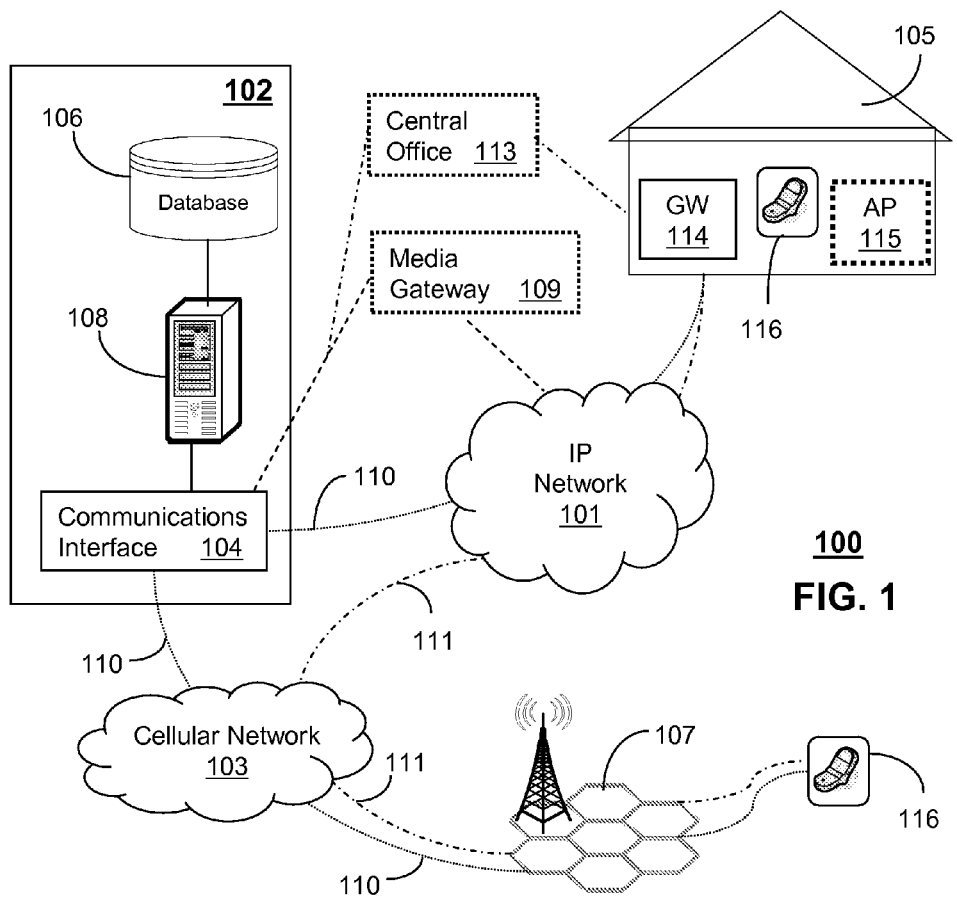
FIG. 1 depicts an exemplary embodiment of multimode VoIP terminals communicating by way of wired and wireless access points (WAPs) with other VoIP terminals and/or a network proxy which collectively operate in a communication system.

FIG. 1 depicts an exemplary embodiment of multimode VoIP terminals 116 communicating by way of wired and wireless access points (WAPs) with other communication devices and/or a network proxy 102 which collectively operate in a communication system 100. The communication system 100 comprises an IP (Internet Protocol) network 101 coupled to the network proxy 102, a cellular network 103 and network elements located in a building 105 representing an enterprise or residence. The IP network 101 utilizes technology for transporting Internet traffic.

In an enterprise or retail setting, the building 105 can include a gateway (GW) 114 or access points (APs) 115 such as a WiFi or Bluetooth APs some of which can provide voice and/or video connectivity services between VoIP terminals 116 or other forms of communication devices of enterprise personnel or retail patrons. In a residential setting, the building 105 can include an AP 115 (as described earlier) or a GW 114 represented by, for example, a residential gateway coupled to a central office 113 utilizing conventional telephonic switching for processing calls with third parties.

The network proxy 102 can be used to control operations of a media gateway 109, the central office 113, the GW 114, and AP 115. Communications between the network proxy 102, VoIP terminals 116 and other network elements of the communication system 100 can conform to any number of signaling protocols such as a session initiation protocol (SIP), or a video communications protocol such as H.323 which combines video and voice over a packet-switched network.

The network proxy 102 can comprise a communications interface 104 that utilizes common technology for communicating over an IP interface with the IP network 101, the media gateway 109, the cellular network 103, the GW 114, and/or the AP 115. By way of the communications interface 104, the network proxy 102 can direct by common means any of the foregoing network elements to establish packet switched data, voice, and/or video connections between VoIP terminals 116 distributed throughout the communication system 100. The network proxy 102 further comprises a memory 106 (such as a high capacity storage medium) embodied in this illustration as a database, and a controller 108 that makes use of computing technology such as a desktop computer, or scalable server for controlling operations of the network proxy 102. The network proxy 102 can operate as an IP Multimedia Subsystem (IMS) conforming in part to protocols defined by standards bodies such as 3GPP (Third Generation Partnership Protocol).

Under the control of the network proxy 102, the media gateway 109 can link packet-switched and circuit-switched technologies such as the cellular network 103 (or central office 113) and the IP network 101, respectively. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for VoIP terminals 116.

The cellular network 103 can support voice and data services over a number of access technologies such as GSM-GPRS, EDGE, CDMA-1X, UMTS, WiMAX, software defined radio (SDR), and other known and future technologies. The cellular network 103 can be coupled to base stations 107 under a frequency-reuse plan for communicating over-the-air with roaming VoIP terminals 116.

Figure 2:
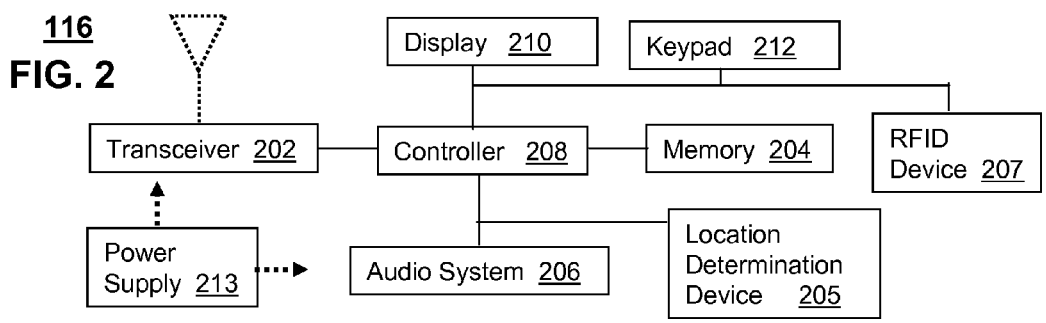
FIG. 2 depicts exemplary embodiments of the multimode VoIP terminal.

FIG. 2 depicts exemplary embodiments of the multimode VoIP terminal 116. In one embodiment, the VoIP terminal 116 can be embodied in an immobile device (e.g., a wireline phone). In another embodiment, the VoIP terminal 116 can include short range communications technology (e.g., a cordless phone, Bluetooth or WiFi) to support mobility within a small area such as the end user's residence or office.

Additionally, the VoIP terminal 116 can utilize a wireless transceiver 202 that supports long-range wireless communications such as supported by the cellular network 103, or for roaming between WiFi and/or WiMAX access networks. In this embodiment, the wireless transceiver 202 of VoIP terminal 116 can utilize technology for exchanging voice and data messages with the base stations 107 (or WiFi and WiMAX access points), which in turn can relay said messages to targeted end user terminals 116.

A multimode VoIP terminal 116 can support a combination of some or all of the aforementioned wireless and wireline access technologies (e.g., POTS, WiFi, WiMAX, Bluetooth™, cordless, and cellular).

Each of the embodiments of the VoIP terminal 116 can further include a memory 204, an audio system 206, a location determination device 205, a radio frequency identification (RFID) device 207, and a controller 208. The memory 204 can comprise storage devices such as RAM, SRAM, DRAM, and/or Flash memories. The memory 204 can be an integral part of the controller 208. The audio system 206 can comprise a low volume speaker for listening to messages near the end user's ear and an associated microphone for exchanging messages with calling parties. The audio system 206 can further utilize a loud speaker for listening to announcements at a distance substantially away from the end user's ear, and as a speakerphone feature.

The location determination device 205 can represent a global positioning system (GPS) receiver for determining a location fix of the VoIP terminal 116. The RFID device 207 can represent a passive or active RFID for short-range communications. The RFID device 207 can be used for retrieving information such as location information from the GW 114 or APs 115. In this embodiment the GW 114 or AP 115 would also include a similar RFID device (although not shown in FIG. 1).

The controller 208 can manage the foregoing components with computing technology such as a microprocessor and/or digital signal processor. The VoIP terminals 116 can further include a display 210 for conveying images to the end user, a keypad 212 for manipulating operations of the VoIP terminal 116, and a portable power supply 213. The audio system 206, display 210, and the keypad 212 can singly or in combination represent a user interface (UI) for interfacing with the end user.

Figure 3:
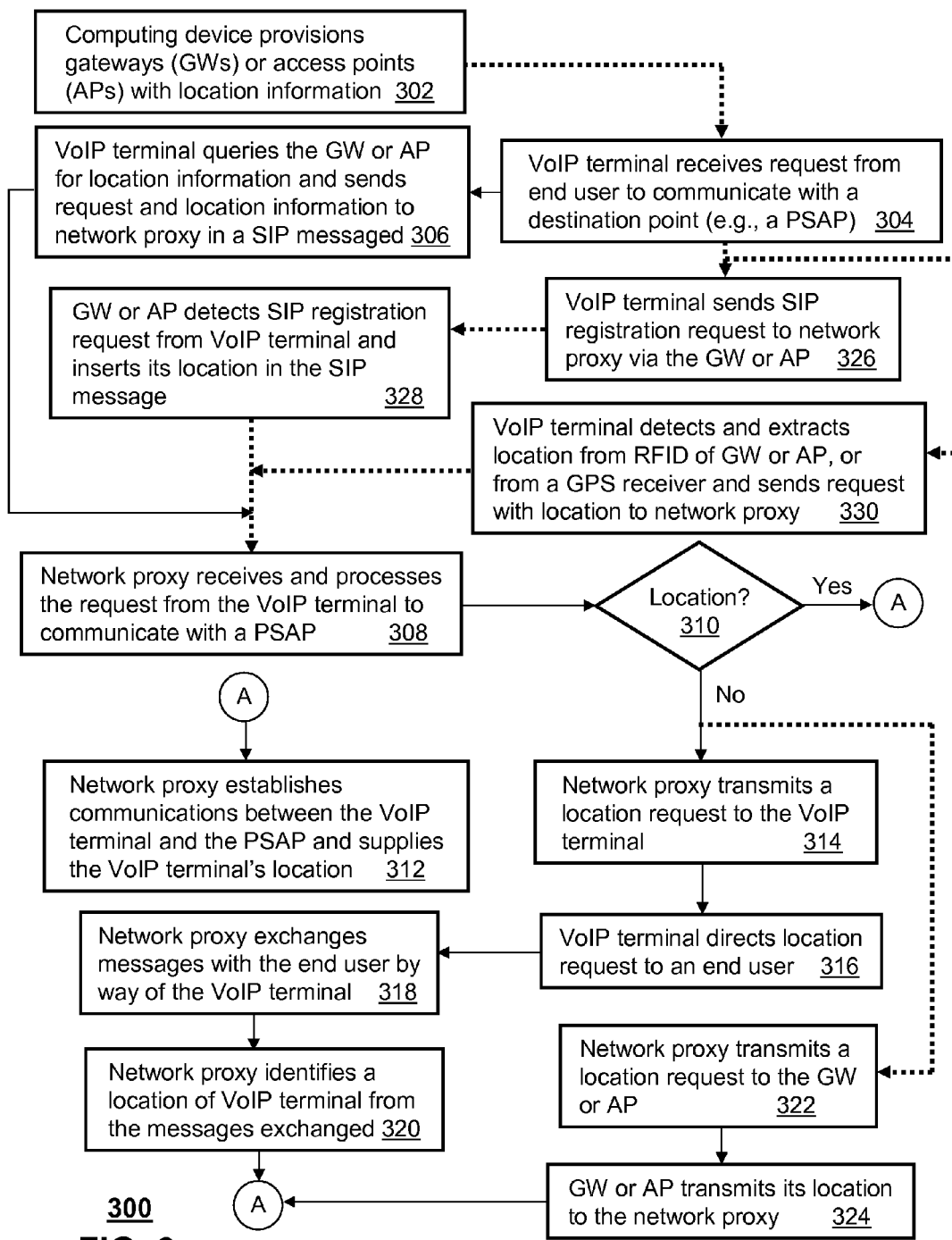
FIG. 3 depicts an exemplary method operating in portions of the communication system.

FIG. 3 depicts an exemplary method 300 operating in portions of the communication system 100. Method 300 has many embodiments as depicted by the dashed lines. It would be apparent to an artisan with ordinary skill in the art that other embodiments not depicted in FIG. 3 are possible without departing from the scope of the claims described below.

With this in mind, in one embodiment, method 300 begins with step 302 in which a computing device such as the network proxy 102 using, for example, a Trivial File Transfer Protocol provisions the GWs 114 and/or the APs 115 with location information known to a service provider of the communication system 100. This step can be implemented once or periodically as the GWs and APs 114, 115 are updated throughout the communication system 100. In step 304 the VoIP terminal 116 can be programmed to receive a request from an end user to communicate with a destination point. The request can represent a mobile or network origination call invoked by the end user by dialing a phone number by way of the VoIP terminal's UI. The destination point can be another VoIP terminal 116, an emergency response center such as a public service access point (PSAP—911), and/or a POTS or circuit-switched communication terminal. For illustration purposes only, the destination point will be assumed to be a PSAP.

In step 306, the VoIP terminal 116 queries the GW 114 or AP 115 for its location. In the same step, the VoIP terminal 116 forwards the request and location information to the network proxy 102 in a SIP message. The request can include an identification (ID) of the PSAP (e.g., 911 or other emergency code) and an ID of the VoIP terminal 116 (such as, for example, its MAC address). In step 308, a call state control function (CSCF) of the network proxy 102 receives and processes the request to communicate with the PSAP, and in step 310 determines whether the SIP message includes location information. Geographic location information can be entered into the SIP message in an Extensible Markup Language XML format.

If the destination point is a PSAP and location information associated with the VoIP terminal 116 is supplied, then the network proxy proceeds to step 312 whereby it establishes communications between the VoIP terminal and the PSAP and supplies to the PSAP the VoIP terminal's location as provided by the GW 114 or AP 115. Since gateways and access points are generally immobile devices, the location given can be relied on as the location of the VoIP terminal 116. If instead the network proxy 102 detects in step 310 that the destination point is a PSAP and location information of the VoIP terminal has not been supplied, the network proxy 102 can proceed to one among steps 314 and 322.

In step 314, the network proxy 102 transmits a location query to the VoIP terminal. In step 316, the VoIP terminal 116 can direct the location request to the VoIP terminal's end user by way of the UI. In step 318, the network proxy 102 can exchange messages with the end user by way of the UI of the VoIP terminal 116. The messages exchanged can be text, voice, Dual Tone Multi-Frequency (DTMF) signals, or combinations thereof processed by, for example, an interactive voice response system (IVR) integrated with the network proxy 102 or managed thereby. From the interactions with the end user (e.g., end user dictates his/her location, or enters location by way of text through the UI), the network proxy 102 in step 320 identifies a location of the VoIP terminal 116 and proceeds to step 312 to enable communications between the VoIP terminal 116 and the PSAP with location information.

In yet another embodiment, the network proxy 102 can be programmed in step 322 to transmit the location query to the GW or AP 114, 115 nearest the VoIP terminal 116 and the network proxy 102. In step 324, the GW or AP 114, 115 transmits it location to the network proxy 102. The network proxy 102 then proceeds to step 312 to establish communications between the VoIP terminal 116 and the PSAP as described earlier. In another embodiment, the GW or AP 114, 115 can represent a WAP 107. In this embodiment, the cellular network 103 can locate the VoIP terminal 116 with common location techniques such as triangulation thereby providing location information to the network proxy 102.

Referring back to step 304, the VoIP terminal 116 can be programmed in another embodiment to submit in step 326 the request to communicate with the PSAP to the network proxy 102 without querying the GW 114 or the AP 115 for its location. In step 328 the GW 114 or AP 115 can be programmed to detect the SIP registration message from the VoIP terminal 116 and proactively insert or append its location to the SIP message. This embodiment replaces the need for the VoIP terminal 116 to query the GW 114 or AP 115 for its location. Steps 308-324 can be applied to this embodiment as previously described.

In yet another embodiment, the VoIP terminal 116 can be programmed in step 304 to proceed to step 330 where it detects and extracts location information from an RFID device located at the GW 114 or AP 115, or from the location determination device 205 of the VoIP terminal 116. Once the location information is retrieved, the VoIP terminal 116 transmits the request and location to the network proxy 102. Steps 308-324 can be similarly applied to this embodiment as described.

It would be apparent to an artisan with ordinary skill in the art from the aforementioned exemplary embodiments that there can be numerous other embodiments applied to the present disclosure. Accordingly, said artisan would expect that the present embodiments can be modified, reduced, or enhanced without departing from the scope and spirit of the claims described below. The reader is therefore directed to the claims below for a fuller understanding of the breadth and scope of the present disclosure.

Figure 4:
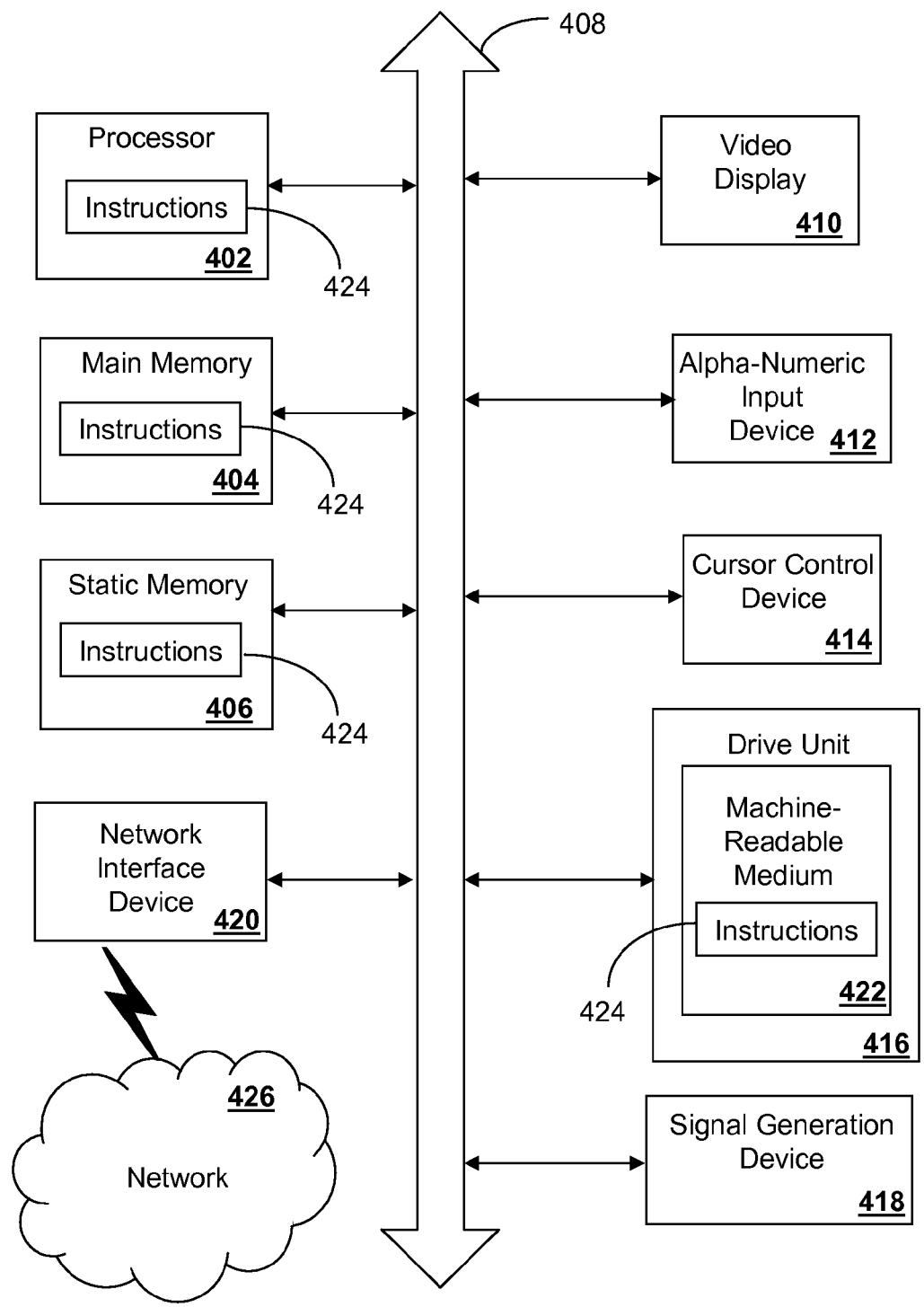
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 47 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium in a wireless access point (WAP), comprising computer instructions for:
    detecting a session initiation protocol (SIP) message initiated by a VoIP terminal requesting communication with a public service access point (PSAP);
    detect from the SIP message a lack of location information associated with the VoIP terminal;
    transmit a location query to one among the VoIP terminal, and a gateway connecting the VoIP terminal to the network proxy
    automatically inserting location information associated with the WAP into the SIP message in response to the VoIP terminal requesting communication with the PSAP and in response to the location query; and
    transmitting the SIP message to a network proxy.

2. The storage medium of claim 1, wherein the WAP comprises one among a wireless fidelity (WiFi) access point, a Worldwide Interoperability for Microwave Access (WiMax) access point, a Bluetooth access point, and a cellular access point.

3. A network proxy, comprising a controller that manages a communications interface in a communication system, wherein the controller is programmed to:
    receive from a Voice over IP (VoIP) terminal a session initiation protocol (SIP) message comprising a request to communicate with a destination point;
    detect from the SIP message a lack of location information associated with the VoIP terminal;
    transmit a location query to one among the VoIP terminal, and a gateway connecting the VoIP terminal to the network proxy;
    receive automatically from one among the VoIP terminal and the gateway a second SIP message comprising geographic location information associated with the VoIP terminal in response to the location query; and
    establish communications between the VoIP terminal and the destination point, supplying to the destination point the location information.

4. The network proxy of claim 3, wherein the controller is programmed to:
    receive from the VoIP terminal a second SIP message comprising location information associated with the VoIP terminal; and
    establish communications between the VoIP terminal and the destination point, supplying to the destination point the location information.

5. The network proxy of claim 3, wherein the controller is programmed to:
    receive from the gateway a second SIP message comprising location information associated with the VoIP terminal; and
    establish communications between the VoIP terminal and the destination point, supplying to the destination point the location information.

6. The network proxy of claim 3, wherein the controller is programmed to process the geographic location information in the second SIP message according to an extensible markup language (XML).

7. The network proxy of claim 3, wherein the gateway comprises a residential gateway, and wherein the network proxy comprises an IP Multimedia Subsystem (IMS) server operating a call state control function (CSCF) for processing the SIP message.

8. The network proxy of claim 3, wherein the SIP message comprises a SIP registration message.

9. The network proxy of claim 3, wherein the location query is directed to an end user of the VoIP terminal, and wherein the controller is programmed to exchange messages with the end user by way of the VoIP terminal to determine the location of the end user.

10. The network proxy of claim 9, wherein the messages correspond to at least one among voice and Dual Tone Multi-Frequency (DTMF) signals generated by the end user by way of the VoIP terminal.

11. The network proxy of claim 3, wherein the destination point comprises at least one among an emergency response center, and public service access point (PSAP).

12. The network proxy of claim 5, wherein the controller is programmed to provision the gateway with the location information.

13. A gateway, comprising a controller programmed to:
  detect a signaling message initiated by a VoIP terminal directed to a network proxy;
  detect from the signaling message a lack of location information associated with the VoIP terminal;
  transmit a location query to one among the VoIP terminal, and the gateway connecting the VoIP terminal to the network proxy
  automatically insert geographic location information associated with the gateway into the signaling message in response to the VoIP terminal initiating the signaling message and in response to the location query; and
  transmit the signaling message to the network proxy.

14. The gateway of claim 13, wherein the signaling message comprises at least one among a session initiation protocol (SIP) message and a video communications protocol message, and wherein the signaling message transports a request for establishing communications with a destination point.

15. The gateway of claim 13, wherein the gateway is provisioned by a computing device with the location information.

16. The gateway of claim 13, wherein the location information comprises a geographic address of the gateway.

17. The gateway of claim 13, wherein the gateway comprises a residential gateway.

18. The gateway of claim 13, wherein the network proxy comprises an IP Multimedia Subsystem (IMS) server.

19. The gateway of claim 13, wherein the controller is programmed to automatically enter the geographic location information into the SIP message in an Extensible Markup Language (XML) format.

20. A computer-readable storage medium in a voice over IP (VoIP) terminal, comprising computer instructions for:
  automatically receiving geographic location information from one among a location determination device of the VoIP terminal and a radio frequency identification (RFID) device of a gateway in response to the VoIP terminal sending a session initiation protocol (SIP) registration request wherein a network proxy detects from an SIP message a lack of location information associated with the VoIP terminal and a location query is transmitted to one among the VoIP terminal and the gateway connecting the VoIP terminal to the network proxy and wherein location information is automatically inserted into the SIP message in response to the VoIP terminal sending the SIP registration request and in response to the location query; and
  transmitting to a network proxy a session initiation protocol (SIP) message comprising the location information and a request to communicate with an emergency response center.

21. The storage medium of claim 20, comprising computer instructions for storing the location information in the SIP message according to an extensible markup language (XML).

* * * * *